US005889836A

United States Patent [19]

Nataf

[11] Patent Number: 5,889,836

[45] Date of Patent: Mar. 30, 1999

[54] APPARATUS TO PREVENT UNAUTHORIZED USE OF TELEPHONE LINES

[76] Inventor: Moshe Nataf, 13 Hermon Street P.O.B. 21270, Afula-Elit, Israel, 18594

[21] Appl. No.: 792,534

[22] Filed: Jan. 31, 1997

[51] Int. Cl.[6] .................... H04M 1/24

[52] U.S. Cl. .................... 379/7; 379/35; 379/27

[58] Field of Search .................... 379/1, 6–7, 31–32, 379/34–35, 33, 145, 164, 188–189, 194, 27–28

[56] References Cited

U.S. PATENT DOCUMENTS

| | | | |
|---|---|---|---|
| 4,760,592 | 7/1988 | Hensley | 379/7 |
| 5,436,959 | 7/1995 | Dake et al. | 379/35 |
| 5,544,221 | 8/1996 | Sheng et al. | 379/7 |

FOREIGN PATENT DOCUMENTS

| | | |
|---|---|---|
| 498734A1 | 8/1992 | European Pat. Off. . |
| 498734B1 | 8/1992 | European Pat. Off. . |
| 2068682 | 8/1981 | United Kingdom . |

*Primary Examiner*—Paul Loomis
*Assistant Examiner*—Duc Nguyen

[57] ABSTRACT

An apparatus comprising a pair of sensors for monitoring the status of a telephone line and a local station which detects unauthorized use and causes actuation of a disruption signal to make the telephone line unusable.

9 Claims, 10 Drawing Sheets

FIG,5A
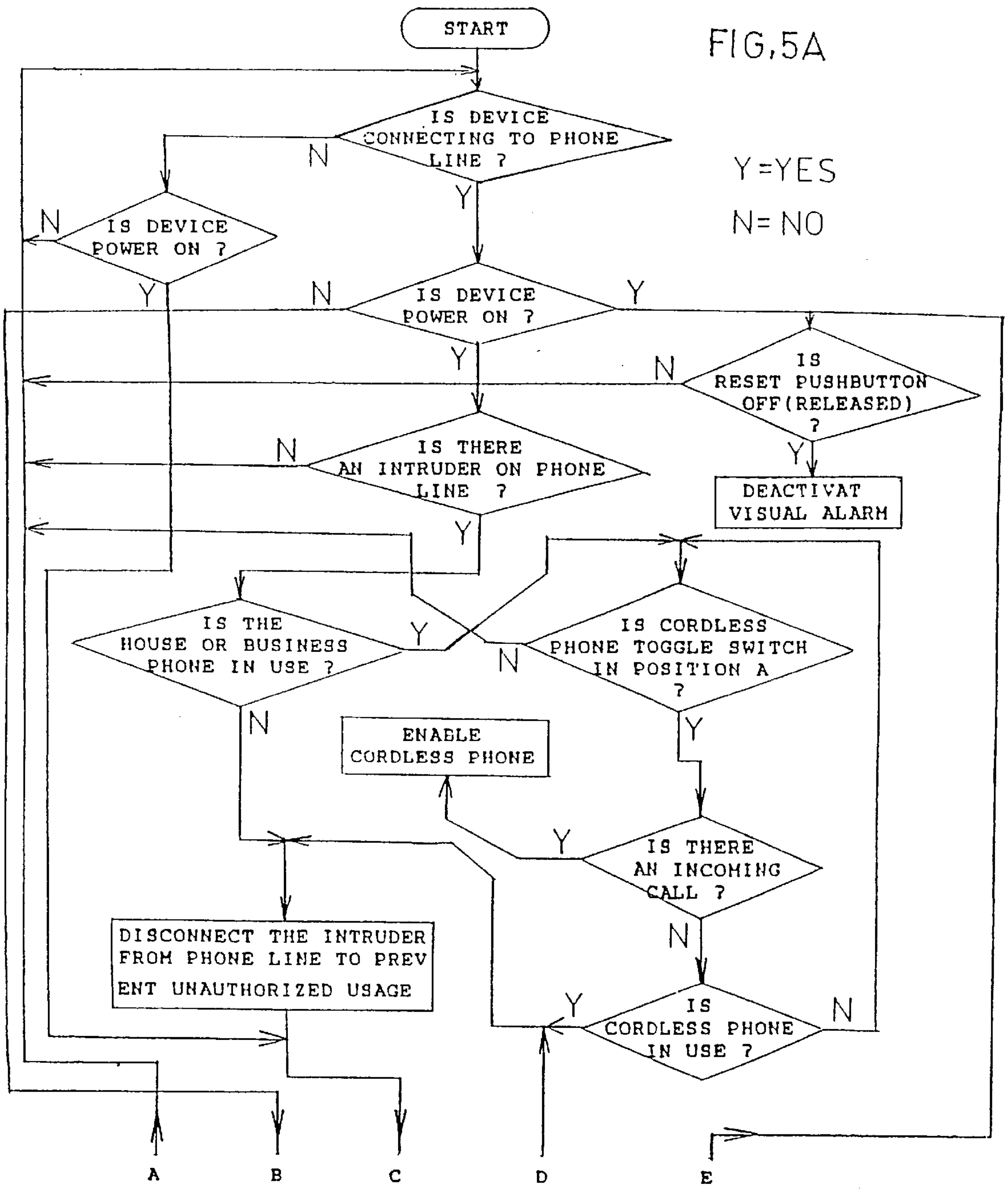

FIG,8

APPARATUS TO PREVENT UNAUTHORIZED USE OF TELEPHONE LINES

BACKGROUND OF INVENTION

This invention relates generally to telephone lines and more particularly to apparatus that protects telephone line systems against unauthorized use.

Previously various codes were used to provide privacy and to avoid fraudulent use of telephone lines; However it soon became apparent that the known system did not provide the required protection and the codes were really easy to obtain.

Therefore no setting system has been developed that would program the protective action. At the present it is easy for an intruder to connect to an unauthorized telephone line, by using a portable telephone with two hooks and connect to outside telephone lines connection box, or using wireless telephones in the same frequency and codes equal to the unauthorized user. There are known systems to solve this problem, so I developed this invention, in the minute anyone attempts to use a telephone line without authorization, the invention will immediately prevent the potential intruder from accomplishing said act.

The object of this invention is to provide for a small and smart easy to use and inexpensive device.

SUMMARY OF INVENTION

The primary object of this invention is to prevent outside sources from being able to use telephone line and thus saving the worry of receiving phone bills for unauthorized calls. Another significant object of this invention is, to notify you when there is trouble on the line by way of visual and sound alarms. Further, a visual and sound alarm will be activated and even if no one is at home, the alarm will still be on when arriving home. However if the line returns to normal after attempted unauthorized use, the sound alarm will stop but the visual alarm will continue until arrival of the owner so as to inform him that there was a problem on the line.

At this time the device could be reset.

A further object of this invention is, to provide for an apparatus can be programmed for use with both visual and sound alarms or only visual alarm according to one's needs.

A still further object of this invention is to provide for a device capable to notify if one puts back the phone receiver in place after talking, by means of a visual indicator.

An additional object of this invention is to provide for a device which can be used with both tone and pulse dialing systems without the need for any adjustments.

Still another object of this invention is to provide for a device capable to detect and prevent disturbing household wireless phones.

Another object of this invention is to provide for an optional connecting systems of a wire/wireless remote control and keypad secret phone lock, with alphanumeric display which shows the time and date when there was intruder on a phone line.

These and other advantages, features and objects will become more apparent from the following description taken in connection with the illustrative embodiments in the accompanying drawings.

BRIEF DESCRIPTION OF THE DRAWINGS

FIG. 5A and FIG. 5B. Shows the flowchart of the device.

DESCRIPTION OF THE PREFERRED EMBODIMENTS

Figure 1:
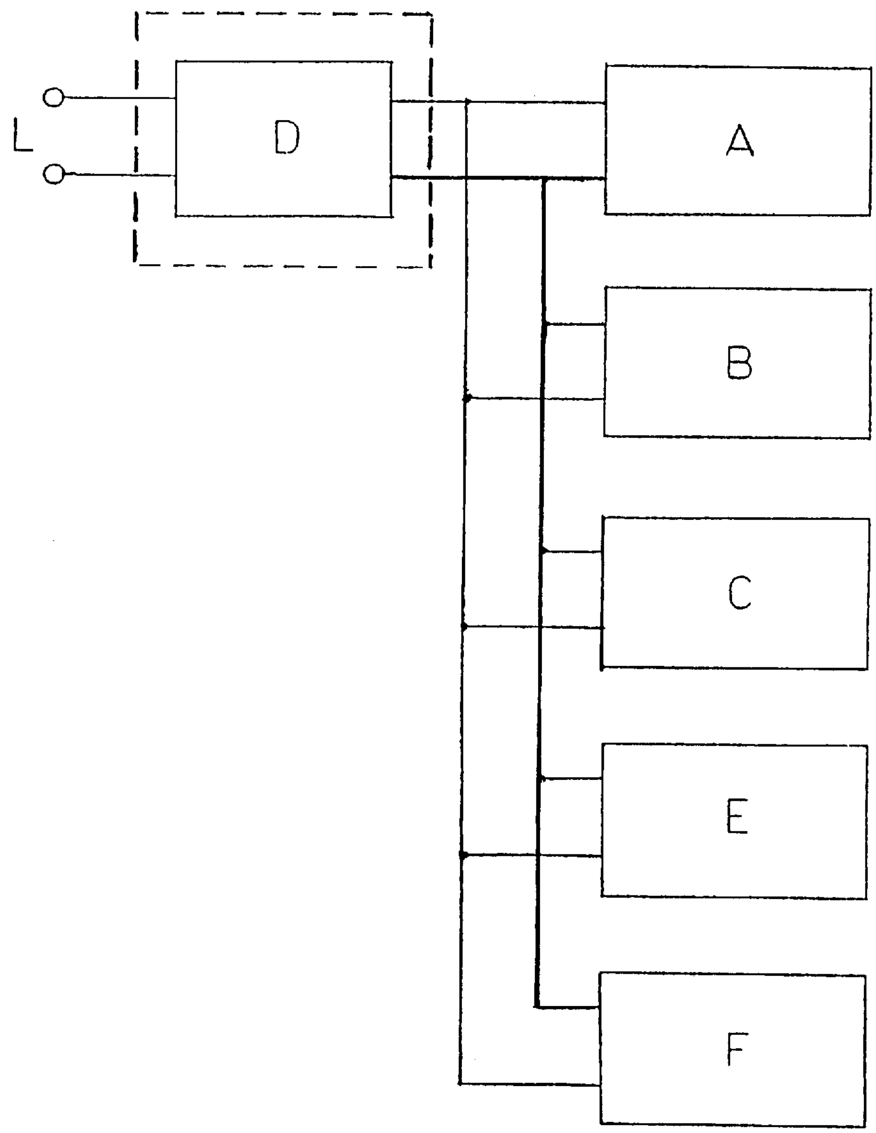
FIG. 1. Shows the examples of various connection possibilities to the device.

With reference to the attached drawings, FIG. 1. There are shown the examples of various connection possibilities to apparatus in accordance with this invention. The devices connected to the apparatus are designated as follows:

A=telephone

B=fax

C=modem

D=apparatus

E=cordless phone

F=answer machine

L=wall phone line

Figure 2:
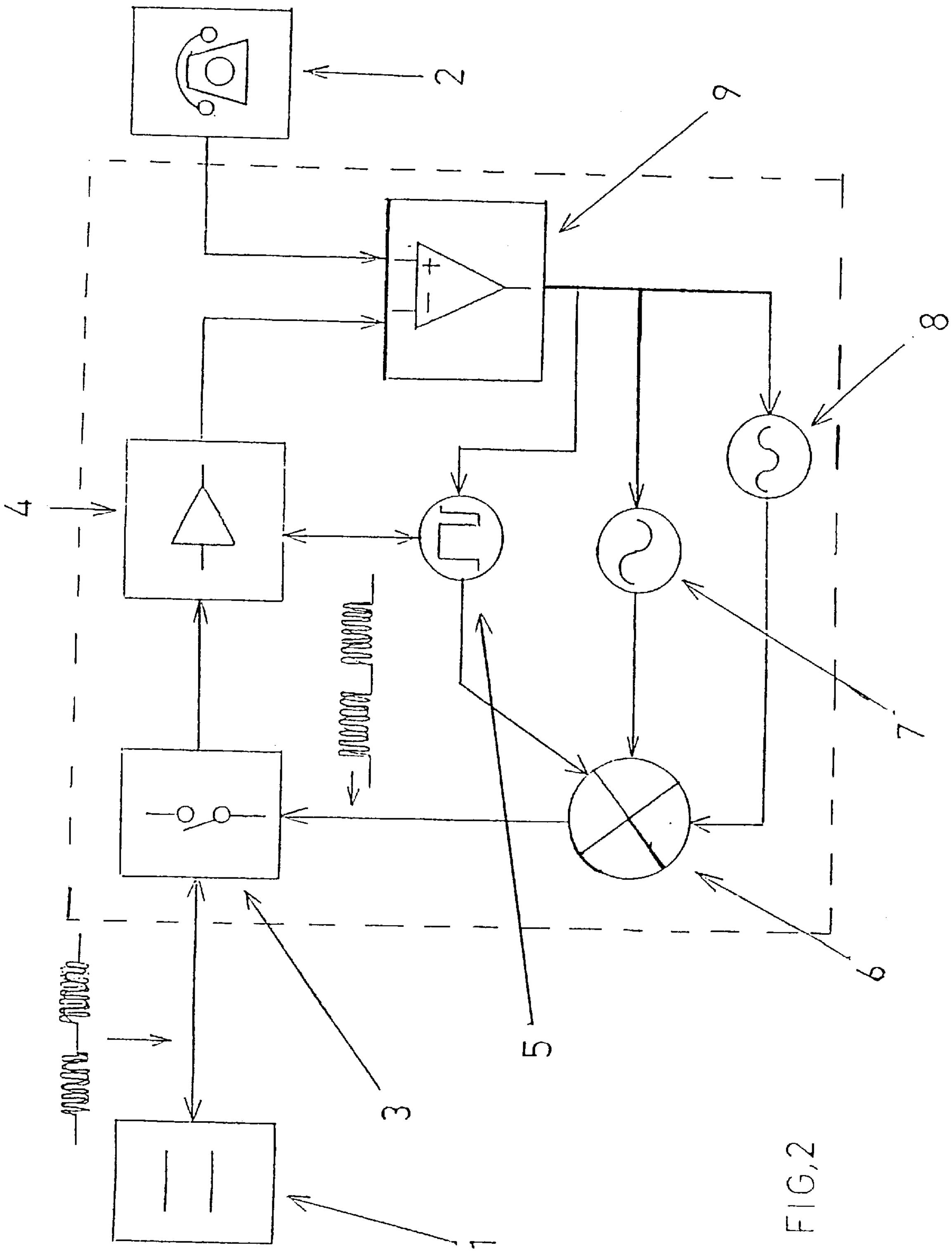
FIG. 2. Shows in general how different components of the device are interconnected.

FIG. 2. Shows in general how different components of the device are interconnected. The device is connected between the phone line (1), and local station telephone (2). In the normal operation mode the device acts like a transparent phone line to the local station. If there is an intrusion on the phone line in other words if the line has been disconnected or if the line has been shorted and/or the normal line voltage dropped, then, first, the comparator (9), checks if the private telephone is in use, if not, the comparator (9) generates a prevention signal, enabling to activate:

1. The period time square wave generator (5), which in its turn enables the buffer (4) for a period of time to check if the line is back to normal. This period of time is called check time.
2. First tone generator (7), producing a signal with a frequency of 941 Hz
3. Second tone generator (8), producing a signal with a frequency of 1209 Hz ;

Mixing of three signals produced by generator (5), generator (7) and generator (8) is carried out by mixer (6). After this the mixed signal is received by modulator (3) when it is modulated by tones and pulses so as to prevent intrusion.

The basic idea of this invention is to modulate the line with several signals in order to prevent intruders, while at the same time allowing use of the line by parties either for incoming or outgoing calls. When there is an intrusion, it is a need to transmit signals on phone line for a period of time, so as to enable checking (feed back) if the intrusion stopped. And the phone line is back to normal operation.

Figure 3:
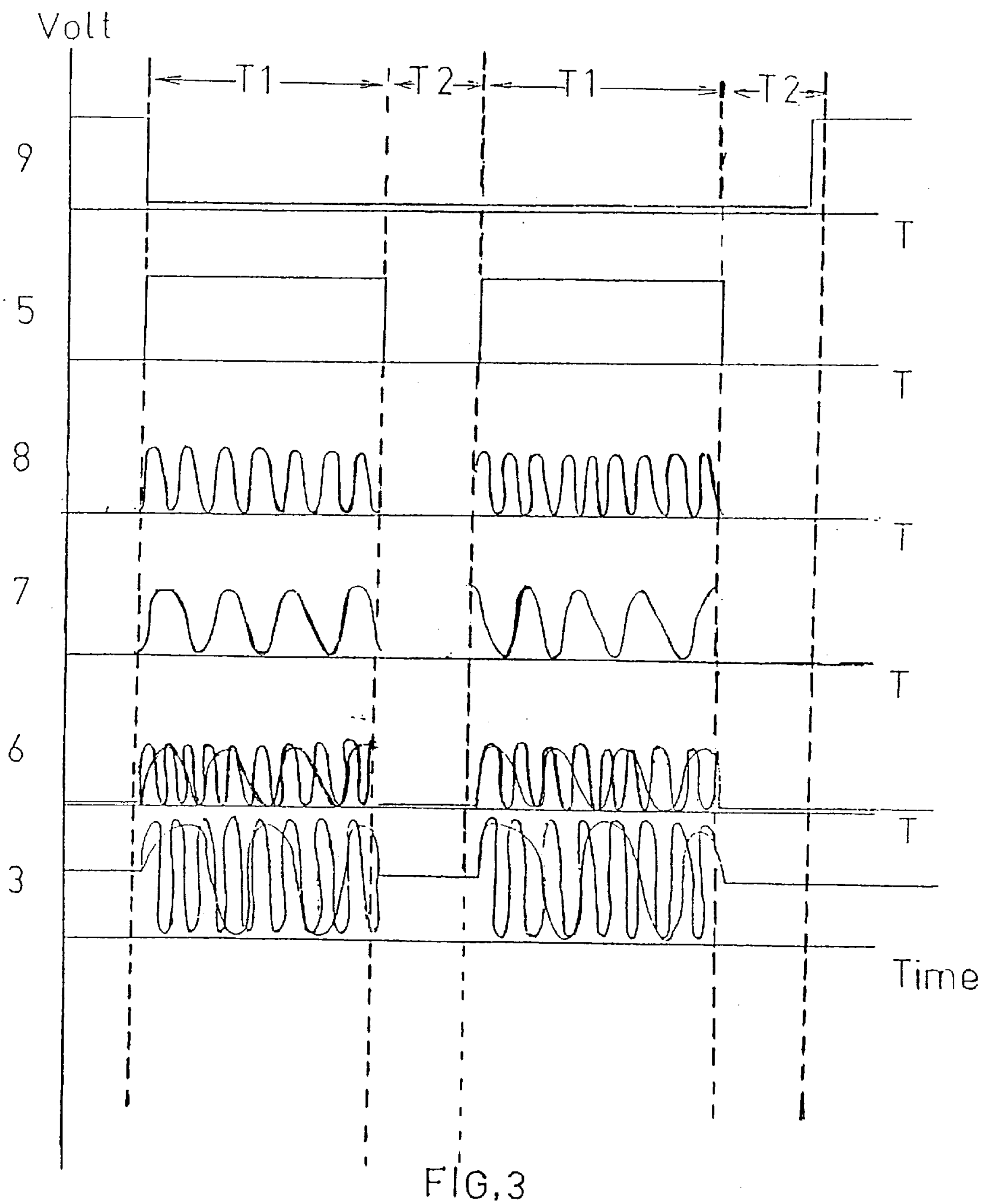
FIG. 3. Shows principle of operation of timing means.

FIG. 3. Shows wave forms corresponding to operation of each device designated in FIG. 2, when T1 is the transmit signal time and T2 is the check time.

The values for T1 and T2 are chosen so as to prevent the intrusion and the same time to enable checking of the line. In practice these values are: T1=1Sec±10%, T2=0.1Sec ±10%.

Figure 4:
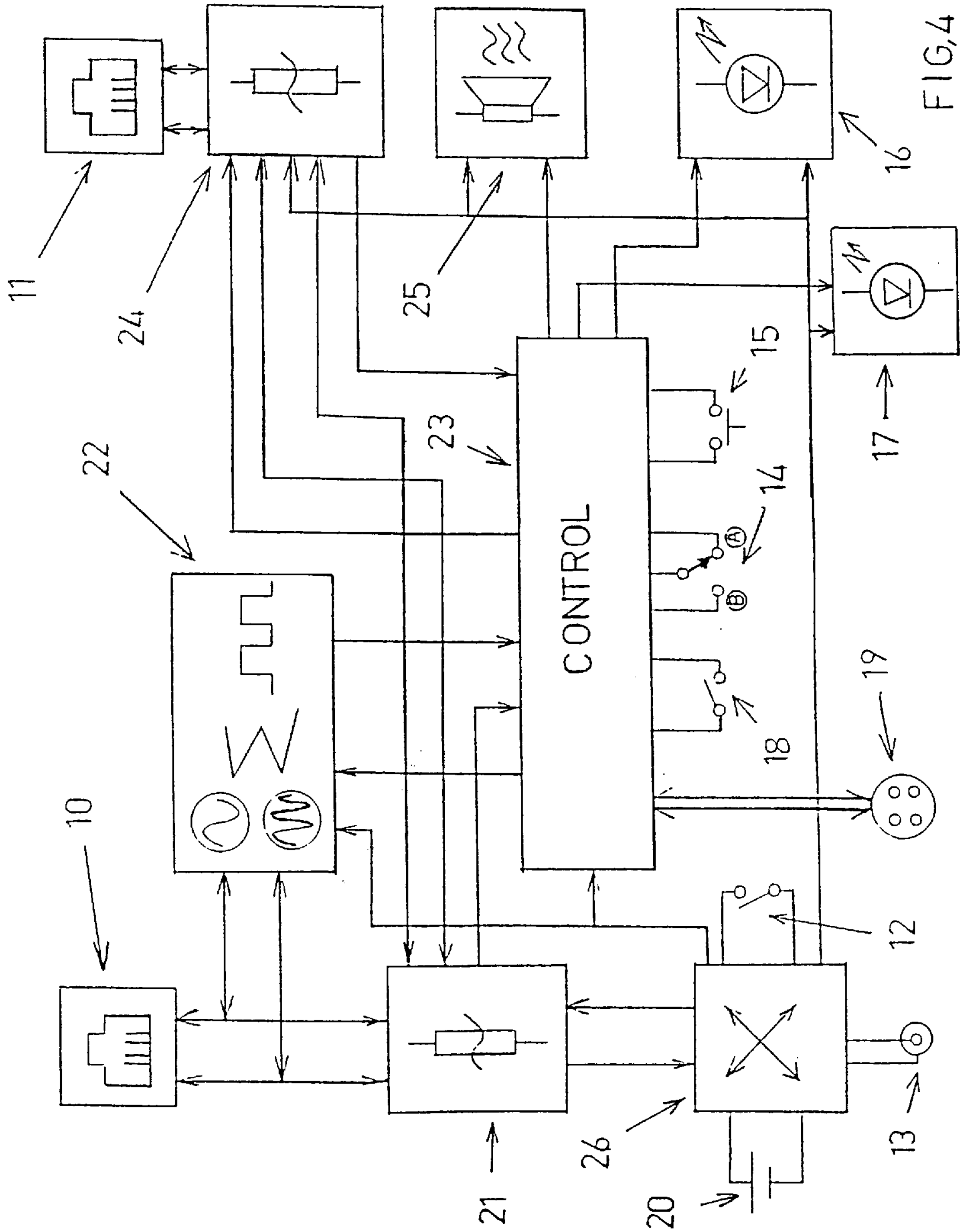
FIG. 4. Shows more detailed block diagram with different components of the device.

FIG. 4. Shows more detailed block diagram with different components of the device. The wall phone line connects to telephone line jack (10), and the local station connects to telephone jack (11). Power supply switch (12) is on and the device receives its power from external power supply source (13) and/or from battery (20) by virtue of power supply distribution means (26). First sensing means (21) senses the current status of the local station. The result obtained from both sensing means goes to control means (23). Here there is compared whether the electrical characteristiy of produced by both sensing means are similar or not. If these characteristiy are dissimilar the control means (23) activates the following:

Disruption signals generating means (22), visual memory alarm means (16) and sound alarm means (25) if its sound alarm switch (18), is on. If both signals are similar the control means (23) deactivated the disruption signals generating means (22), and sound alarm means (25). The visual memory alarm means (16) is still active and can be deactivated by reset push button switch (15). The visual talk phone indicator means (17), is activated, when the second sensing means (24) detects in local station an off-hook condition. By virtue of cordless phone switch (14) it is possible to choose working mode operation either for cordless phone or for regular telephone.

Figure 5B:
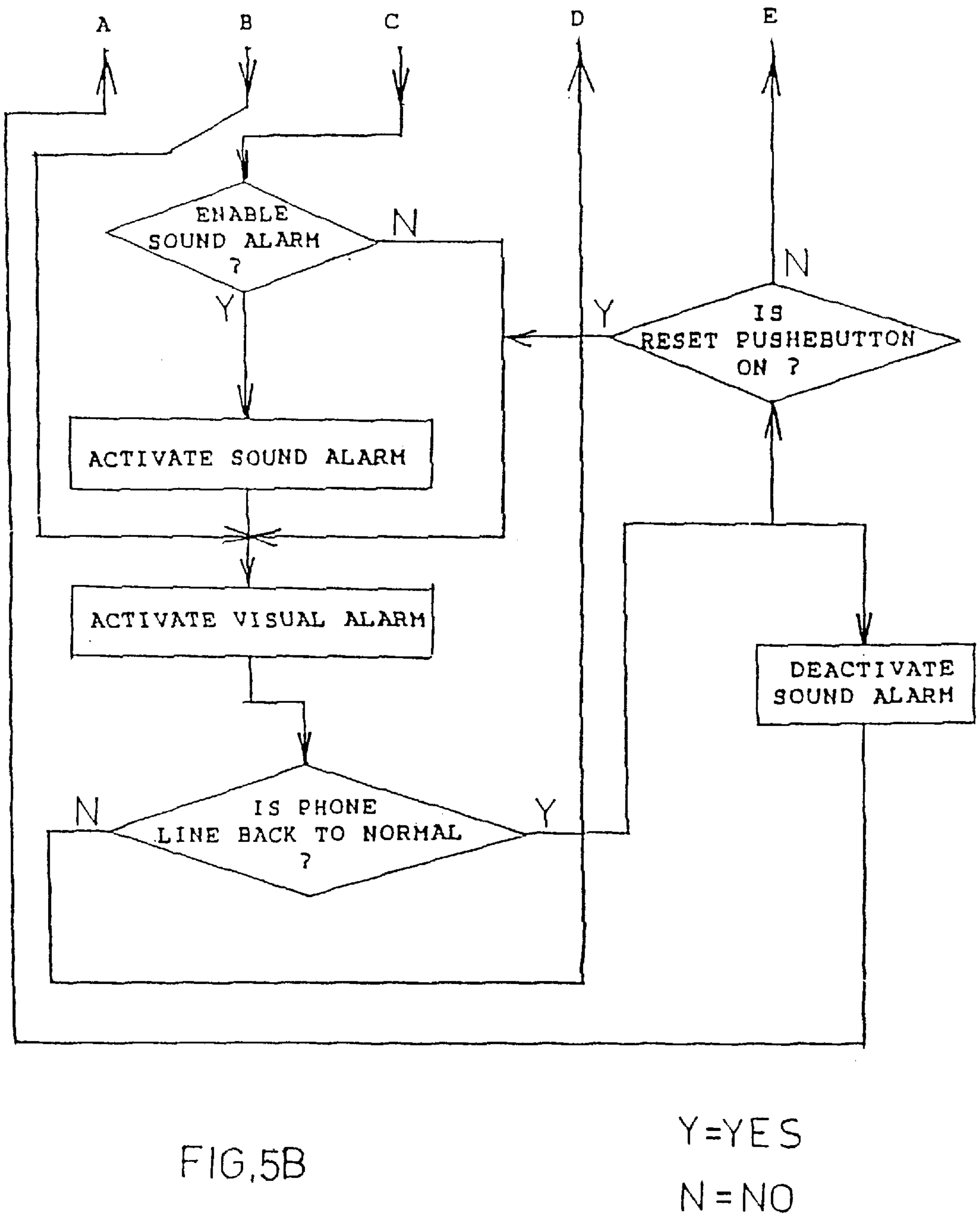

An optional features plug (19) enables connecting with additional devices with new functions, If needed. With reference to FIG. 5A and FIG. 5B there is shown a flowchart sequence operation of the apparatus in accordance with the present invention.

Figure 6:
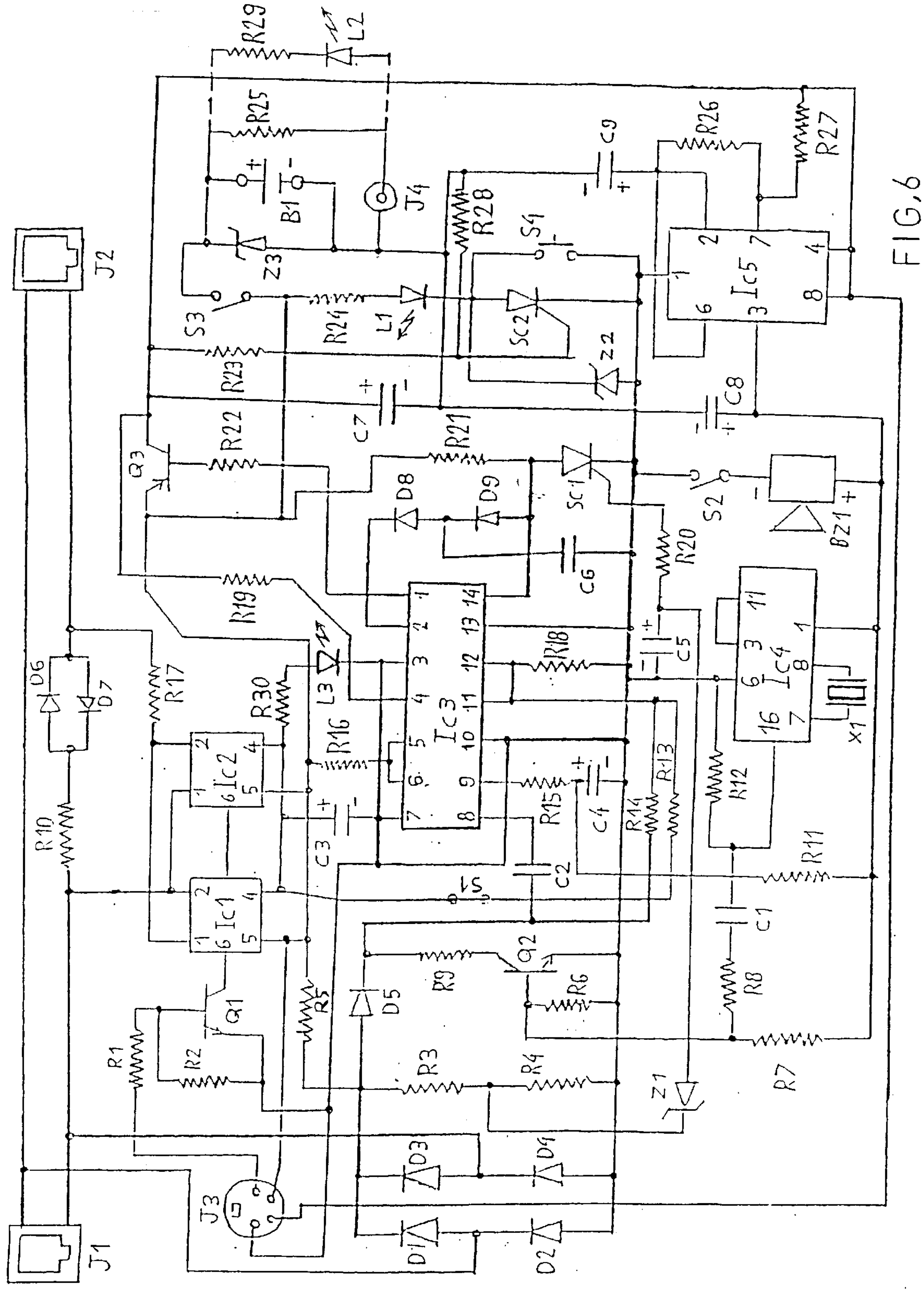
FIG. 6. Shows detailed electronic circuit.

FIG. 6. Shows detailed electronic circuit comprising the electronic components and their functions are in following:

J1 is the phone line jack (1).

J2 is the local station telephone jack (2).

J3 is the optional features plug (19).

J4 is the external power supply source jack (13).

S1 is the cordless phone switch (14).

S2 is the sound alarm switch (18).

S3 is the power supply switch (12).

S4 is the reset push button switch (15).

L1 is the visual memory alarm means (17).

L3 is the visual talk phone indicator means (16).

B1 is the battery (20).

BZ1 is the sound alarm means (25).

IC1,IC2 are the second sensing means (24).

D1–D5 with part of IC3 are first sensing means (22).

IC3 main part of him is the control means (23).

IC4, IC5 are the disruption signal generating means (22).

Figure 7:
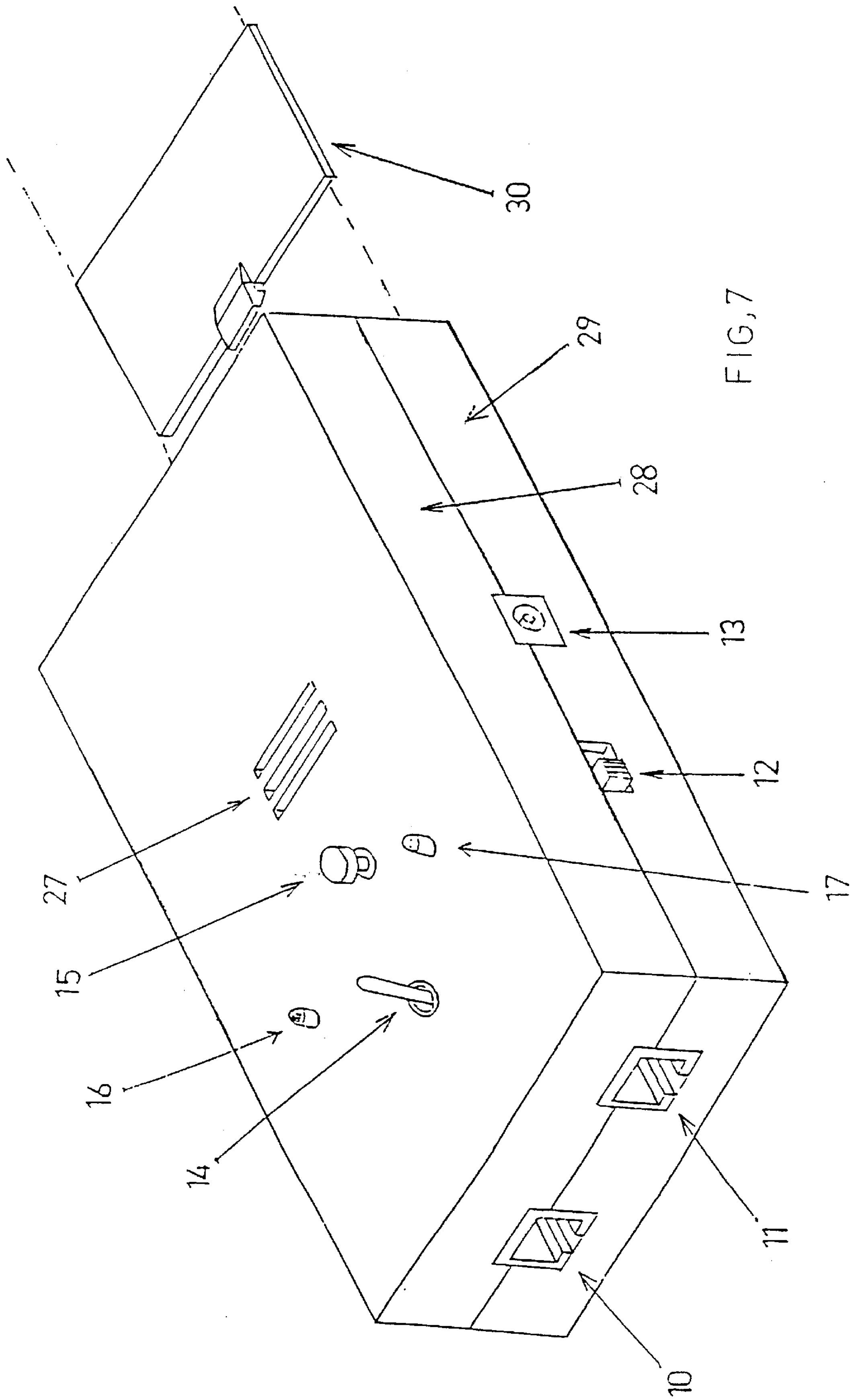
FIG. 7. Shows top isometric view of the device.
Figure 8:
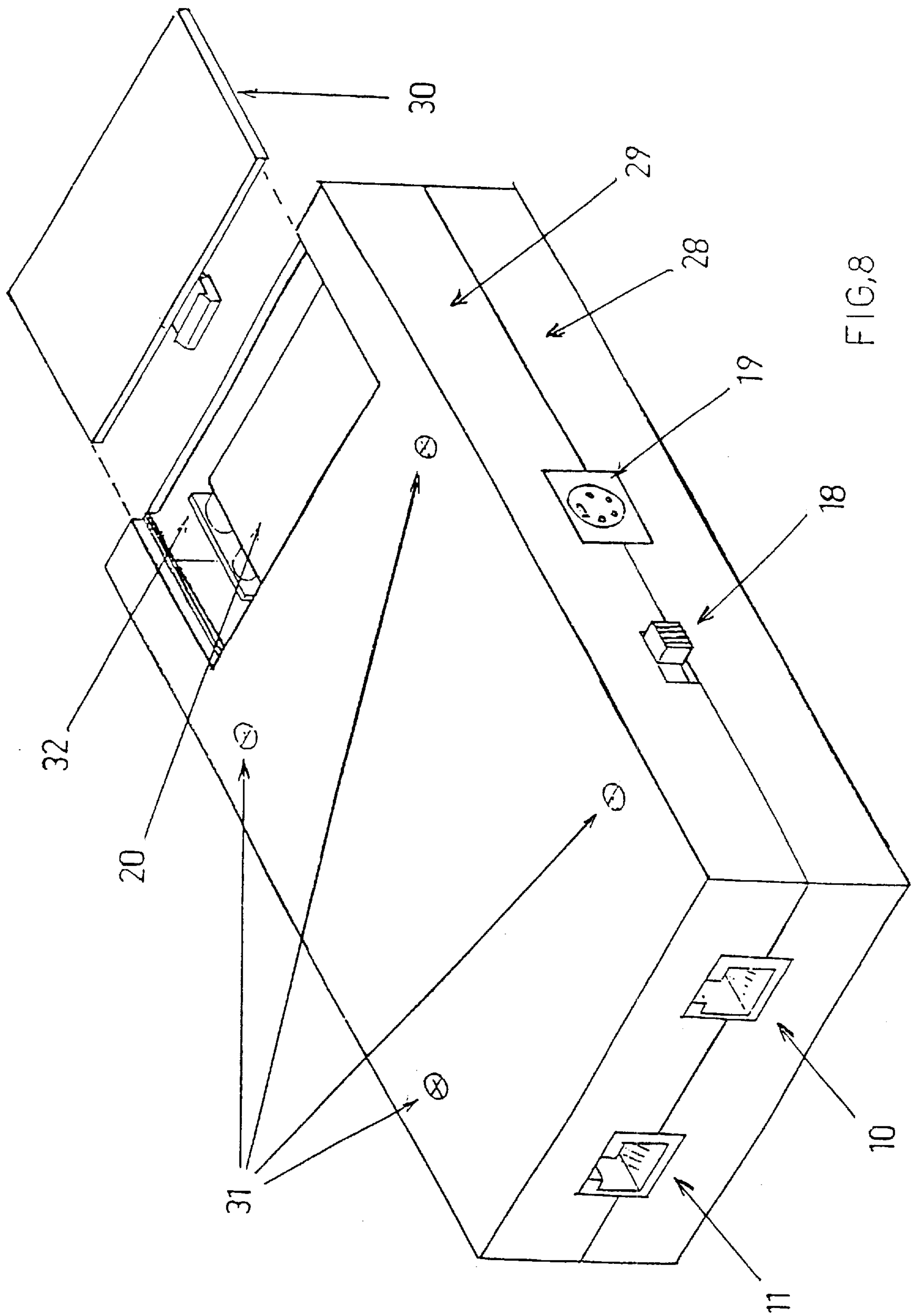
FIG. 8. Shows isometric view of the device from the bottom.
Figure 9:
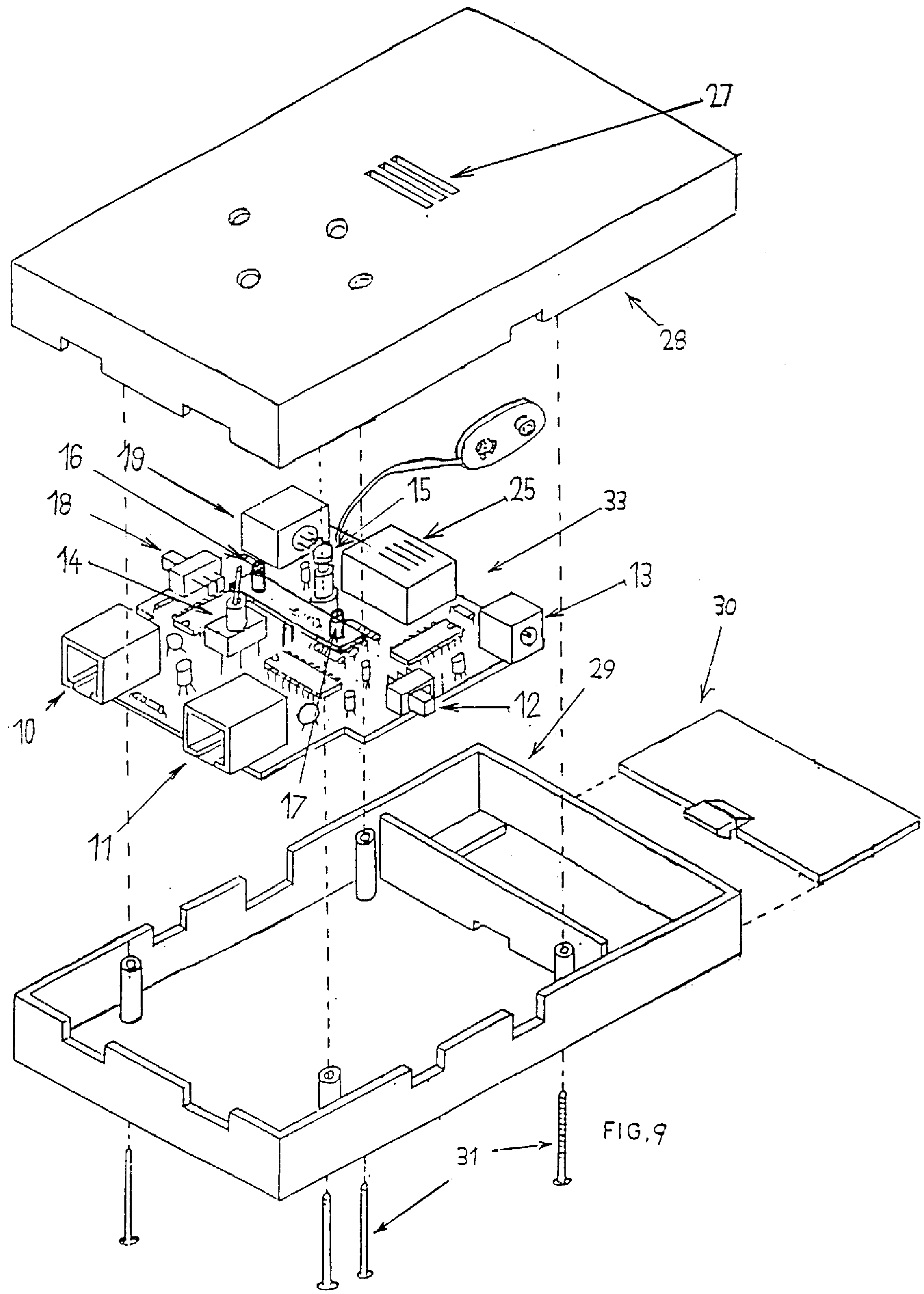
FIG. 9. Shows an exploded view of the assembled device.

FIG. 7, FIG. 8, FIG. 9, shows the isometric view of the device when the device is made from three hard plastic parts, top cover (28) bottom cover (29) and battery cover (30) and inside is located the electronic circuit (33). The electronic circuit (33) including the all outside communication controls likes switches jacks visual display and audio means.

In FIG. 7 and FIG. 8 there is shown top and bottom view of the device while one can see input and output jacks (10,11,13,19) and control switches (12,14,15,18), display means (16,17) and doorways for listening the sound alarm signal (27) and also we can see the battery cover (30) which moves on track into the case and is locked by little tongue which opens by pressing.

Two parts of case (28,29) tied by four screws (31). Can be seen in FIG. 9. The screws go thru an four plastic cylindrical guides on bottom cover (28) of case with the electronic circuit (33).

| COMPONENT LIST |
|---|
| RESISTORS ¼W |
| R1: 10K Ohm +– 10% |
| R2: 1K Ohm +– 10% |
| R3: 47K Ohm +– 10% |
| R4: 1M Ohm +– 10% |
| R5: 22K Ohm +– 10% |
| R6: 47K Ohm +– 10% |
| R7: 68K Ohm +– 10% |
| R8: 15K Ohm +– 10% |
| R9: 560 Ohm +– 10% |
| R10: 56 Ohm +– 10% |
| R11: 150K Ohm +– 10% |
| R12: 33K Ohm +– 10% |
| R13: 33K Ohm +– 10% |
| R14: 3.3M Ohm +– 10% |
| R15: 10K Ohm +– 10% |
| R16: 1M Ohm +– 10% |
| R17: 33 Ohm +– 10% |
| R18: 150K Ohm +– 10% |
| R99: 1M Ohm +– 10% |
| R20: 220K Ohm +– 10% |
| R21: 1M Ohm +– 10% |
| R22: 1M Ohm +– 10% |
| R23: 150K Ohm +– 10% |
| R24: 3.3K Ohm +– 10% |
| R25: 47 Ohm +– 10% |
| R26: 150K Ohm +– 10% |
| R27: 120K Ohm +– 10% |
| R28: 47K Ohm +– 10% |
| R29: 100 Ohm (option) +– 10% |
| R30: 3.3K Ohm +– 10% |
| CAPACITORS |
| C1: 0.1 μF 10 V (min) |
| C2: 0.33 μF 150 V (min) |
| C3: 4.7 μF 10 V (min) |
| C4: 4.7 μF 10 V (min) |
| C5: 4.7 μF 10 V (min) |
| C6: 0.1 μF 10 V (min) |
| C7: 4.7 μF 10 V (min) |
| C8: 4.7 μF 10 V (min) |
| C9: 4.7 μF 10 V (min) |
| DIODES (SILICON) |
| D1: Vrrm 150 V (min) Io 100 mA (min) |
| D2: Vrrm 150 V (min) Io 100 mA (min) |
| D3: Vrrm 150 V (min) Io 100 mA (min) |
| D4: Vrrm 150 V (min) Io 100 mA (min) |
| D5: Vrrm 150 V (min) Io 100 mA (min) |
| D6: Vrrm 25 V (min) Io 100 mA (min) |
| D7: Vrrm 25 V (min) Io 100 ma (min) |
| D8: Vrrm 25 V (min) Io 100 ma (min) |
| D9: Vrrm 25 V (min) Io 100 ma (min) |
| ZENER DIODES (SILICON) |
| Z1: 62 V 250 mW |
| Z2: 12 V 250 mW |
| Z3: 10 V 500 mW |
| TRANSISTORS (SILICON) |
| Q1: Vcb 20 V (min), Vce 15 V (min), Ic 100 mA (min) hfe 100, PD 100 mW (min), n.p.n. (TO 92) |
| Q2: Vcb 180 V (min), Vce 160 V (min), Ic 100 mA (min) hfe 100, PD 100 mW (min) n.p.n. (TO 92) |
| Q3: Vcb 20 V (min), Vce 15 (min), Ic 100 mA (min) hfe 100, PD 100 mW (min), p.n.p (TO 92) |
| THYRISTORS (SILICON) |
| SC1, SC2: Vdrm 12 V (min.), Igt 0.2 mA, Vgt 0.8 V, Idrm 50 mA (min), (TO 92). |
| INTEGRATED CIRCUITS (SILICON) |
| I.C 1, I.C 2: Optoelectronic-coupler, Vf 1.6 V (max), If 10 mA (max). |

-continued

| COMPONENT LIST |
|---|
| INTEGRATED CIRCUIT |
| I.C 3: Control. |
| I.C 4: Two sine wave generators, F1 = 941 Hz +/− 0.8%, F2 = 1209 Hz +/− 0.8%. |
| I.C 5: Controld square wave generator, T1 = 1 Sec +/− 10% T2 = 0.1 Sec +/− 10% |
| MISCELLANEOUS |
| X1: 3.579 Mhz tv crystal standard. |
| S1: Mini toggle switch S.P.D.T on,on 100 mA (min). |
| S2: Mini slide switch on,on 100 mA (min). |
| S3: Mini slide switch on,on 100 mA (min). |
| S4: Pushbutton switch n,o 100 mA (min). |
| J1: Phone pcb jack 4/4 low profile. |
| J2: Phone pcb jack 4/4 low profile. |
| J3: 4 Pin miniature din jack. |
| J4: Dc power jack. |
| BZ1: Buzzer, or any sound alarm circuit 3 V–8 V < 30 mA. |
| L1: Led red < 3 mA. |
| L2: Led yellow < 3 mA (option). |
| L3: Led green < 3 mA |
| B1: Battery holder 9 v. |

LIST OF REFERENCE NUMERALS

(1). Phone line.
(2). Local station telephone.
(3). Modulator.
(4). Buffer.
(5). Period time square wave generator.
(6). Mixer.
(7). First tone generator.
(8). Second tone generator.
(9). Comparator.
(10). Telephone line jack.
(11). Telephone jack.
(12). Power supply switch.
(13). External power supply source.
(14). Cordless phone switch.
(15). Reset push button switch.
(16). Visual memory alarm means.
(17). Talk phone indicator means.
(18). Sound alarm switch.
(19). Optional features plug.
(20). Battery.
(21). First sensing means.
(22). Disruption signal generating means.
(23). Control means.
(24). Second sensing means.
(25). Sound alarm means.
(26). Power supply distribution means.
(27). Sound alarm doorways.
(28). Top cover.
(29). Bottom cover.
(30). Battery cover.
(31). Four screws.
(32). Battery supply plug.
(33). Electronic print circuit board.

I claim:

1. A monitoring device located between a telephone line and a local station, said monitoring device being capable of detecting and preventing unauthorized use of said telephone line and comprising:

A) First sensing means for monitoring the current status of said telephone line;

B) Second sensing means for monitoring the current status of said local station;

C) Comparing means for comparing signals generated by said first and second sensing means and capable upon detecting unauthorized use of said telephone line to generate and transmit a disruption signal;

D) Disruption signal generating means for generating and transmitting to said telephone line a disruption signal so that said telephone line becomes unusable, said disruption generating means being activated by said disruption signal generated by said comparing means upon detection of unauthorized use of said telephone line;

E) Timing means for creating first predetermined time interval sufficient for transmitting said disruption signal and for creating second predetermined interval sufficient for comparing said signals generated by said first and second sensing means;

F) Buffer means for blocking said signals generated by said first and second sensing means during said first time intervals and for blocking said disruption signal during said second time intervals;

G) Power supply means for energizing said sensing means, said comparing means, said disruption signal generating means, said timing means and said buffer means.

2. The monitoring device as defined in claim 1, comprising alarm means for annunciating about detection of unauthorized use of said telephone line.

3. The monitoring device as defined in claim 1, in which said disruption signal generating means comprises at least one tone generator and a pulse generator.

4. The monitoring device as defined in claim 3, comprising two tone generators, preferably formed as tone sine wave generators and said timing means is formed as a programmed square wave pulse generator.

5. The monitoring device as defined in claim 4, comprising mixing means for mixing tone sine waves produced by said tone generators with square wave pulses produced by said pulse generator.

6. The monitoring device as defined in claim 4, comprising modulating means for coordination of parameters of said disrupting signal with parameters of said telephone line.

7. The monitoring device as defined in claim 6, in which said first sensing means is formed integrally with said modulating means.

8. The monitoring device as defined in claim 1, comprising detection means for identifying an off-hook condition of said telephone and visual indicating means for annunciating thereabout.

9. The monitoring device as defined in claim 1 comprising display means for visual displaying the time and date when unauthorized use of said telephone line takes place.

* * * * *